(12) United States Patent
Svensson

(10) Patent No.: US 6,446,621 B1
(45) Date of Patent: Sep. 10, 2002

(54) SAW WIRE

(75) Inventor: Anders Svensson, Huskvarna (SE)

(73) Assignee: Hagby Asahi AB, Nora (SE)

( * ) Notice: Subject to any disclaimer, the term of this patent is extended or adjusted under 35 U.S.C. 154(b) by 80 days.

(21) Appl. No.: 09/621,286

(22) Filed: Jul. 20, 2000

Related U.S. Application Data

(63) Continuation of application No. PCT/SE99/00064, filed on Jan. 19, 1999.

(30) Foreign Application Priority Data

Jan. 21, 1998 (SE) .............................................. 9800132

(51) Int. Cl.[7] .................................................. B28D 1/08
(52) U.S. Cl. .............................. 125/21; 125/22; 83/830; 83/831; 451/298
(58) Field of Search ............... 125/21, 22; 83/830–832; 30/381; 451/298

(56) References Cited

U.S. PATENT DOCUMENTS

| 4,971,022 A | * | 11/1990 | Scott et al. ..................... 125/21 |
| 5,123,400 A | * | 6/1992 | Edgerton ..................... 125/21 |
| 5,136,783 A | * | 8/1992 | Bell et al. ..................... 30/384 |
| 5,184,598 A | * | 2/1993 | Bell ............................. 125/21 |
| 5,215,072 A | * | 6/1993 | Scott ........................... 125/21 |
| 5,305,730 A | | 4/1994 | Fish |
| 5,671,725 A | * | 9/1997 | Dishaw ........................ 125/21 |
| 6,138,658 A | * | 10/2000 | Bell ............................. 125/21 |
| 6,178,960 B1 | * | 1/2001 | Svensson ..................... 125/21 |
| 6,283,112 B1 | * | 9/2001 | Berglund ..................... 125/21 |

FOREIGN PATENT DOCUMENTS

| CH | 287499 | 4/1953 |
| DE | 38 11 265 | 10/1989 |
| EP | 0 376 128 | 7/1990 |
| EP | 0 527 344 | 2/1993 |
| EP | 0 773 092 | 5/1997 |
| FR | 2 674 173 | 9/1992 |
| WO | WO 93/00208 | 1/1993 |
| WO | WO 97/16291 | 5/1997 |

* cited by examiner

*Primary Examiner*—George Nguyen
(74) *Attorney, Agent, or Firm*—Pillsbury Winthrop LLP

(57) ABSTRACT

A saw wire according to the invention has two parallel wire strings having a number of saw elements evenly distributed along the wire strings. A saw element includes a platform and a cutting plate. The platform has grooves intended to receive respective parallel wire strings and a groove which is open towards the bottom to receive a driving wheel and a pulley.

12 Claims, 3 Drawing Sheets

SAW WIRE

This application is a continuation of PCT/SE99/0064 filed Jun. 19, 1999.

This invention is for a saw wire which may be used for cutting stone, concrete and similar materials and also for cutting wood, plastics, etc. The saw wire is primarily intended for hand-held motor driven saws but it may also be used with stationary saws and other equipment.

Cutting stone and concrete occurs during building activities, e.g., for making openings for doors and windows. In the same operation, it may be required to cut several different materials, e.g., wood, concrete and reinforcements rods. For this kind of cutting, it is known to make use of saws having large, circular cutting blades. The use of hand held motor driven saws having saw blades and chains is also known. In all of these cases, special problems occur, among other reasons because the materials are very hard and cause considerable wear of the active surfaces of the saw chains and other equipment. Circular saw-blades also cause a considerable "over saw" beyond the required dimensions of the opening. There are also problems with the adaptation of the distribution of cogs in the case of saws having power driven chains or the like. There is therefore a need for continuous lubrication of the chain in order to reduce the wearing of moving parts and reduce the friction in contact with the saw blade.

The present invention is for a saw wire by means of which the said disadvantages may be wholly or partly eliminated. The saw wire of the invention also enables comparatively narrow cuts, the width of which are constant and do not change due to the wear during the sawing.

The invention will be described below in greater detail with reference to the embodiments which are shown in the enclosed figures.

Figure 1:
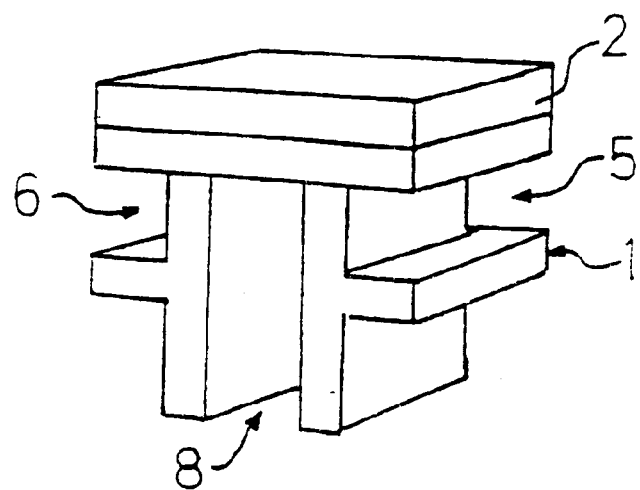
FIG. 1 shows a platform having a cutting plate fixed upon it forming a saw element.

A saw wire according to the invention has two parallel strings of wire having a number of saw elements evenly distributed along the wires. The saw element shown in FIG. 1 includes a platform 1 and a cutting plate 2, which is arranged on the top of the platform and attached thereto. The platform 1 has two cut-outs or grooves 5, 6 which are open to the sides and which surround two parallel strings of wire 3, 4 and a groove 8 which is intended to receive pulley or drive wheels. Preferably the groove 8 extends itself so far towards the surface for mounting of the cutting plate on the platform that it is at least as close to this surface as the side grooves 5, 6. The two equally long wires 3, 4 form endless loops which are parallel with each other and carry a number of saw elements evenly distributed along the wires. The strings of wire are arranged at a distance from each other, one outside each of the planes of the sides of the pulley and drive wheels and it is preferred that the wires run along the outside of the periphery part of the pulley 13.

The free space between and within the saw elements is preferably wholly or partly filled with a filler 7. This is preferably made from elastic material, for example urethane rubber, and it adheres to the contacting surfaces of the wires and saw elements of the saw wire keeping them together. It is convenient that the filler does not extend itself all the way up to the upper surface of the cutting plates but stops a few millimetres below these surfaces.

Figure 3:
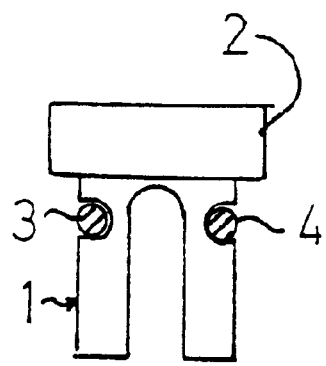
FIGS. 3 and 4 show an alternative embodiment of a saw element.
Figure 4:
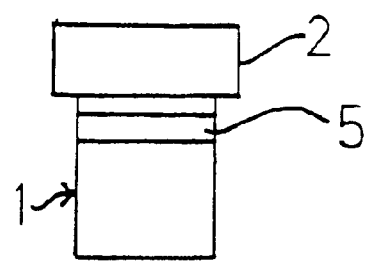

The cutting plate 2 is mounted onto the top surface of the platform 1. The cutting plate is a little wider than the platform, preferably about 0.5 mm wider, the width of the cutting plate is to be understood as the width at right angle to the lengthwise extension of the saw wire. If the cutting plate 2 is narrower than the platform 1 the sawed cut out will be narrower than the platform which brings with it that the saw wire will get caught or be severely worn at its sides. An alternative embodiment of a saw element is shown in FIGS. 3 and 4. The grooves in the platform for receiving of wires and wheels are than somewhat differently designed and the cutting plate is wider than the platform. In the figures there are no special means shown for the fastening of the cutting plates on the platforms. The fastening may be by means of soldering or in any other suitable way and also fasteners may be used.

The cutting substance of the cutting plates is selected with consideration of its intended use. For hard materials the cutting plate may contain diamond or crushed hard metal and be made by sintering or electroplating, for softer materials plates with ground cutting edges may be used.

Figure 2:
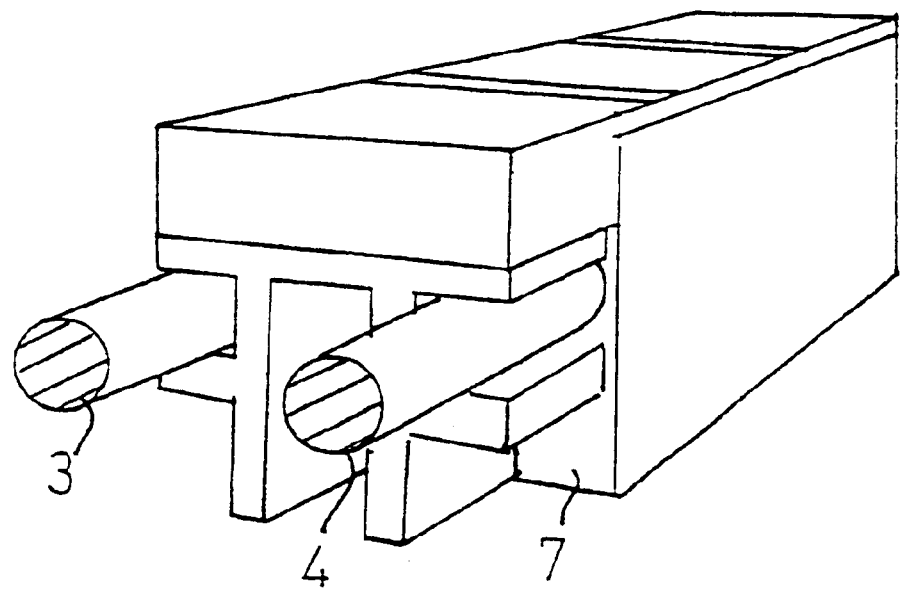
FIG. 2 shows a part of a saw wire, partly in cross section.
Figure 6:
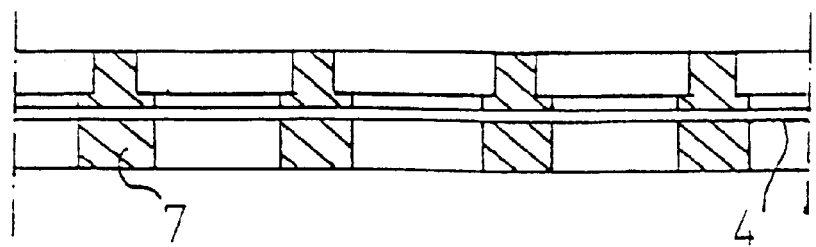
FIG. 6 shows, partly in cross section, a part of a saw wire.

Parts of a saw wire are shown in FIGS. 2 and 6, in perspective view and in cross section along a part of its length. The number of saw elements of a saw wire may vary within wide limits, usually between 50–150 units for hand-held equipment.

Figure 5:
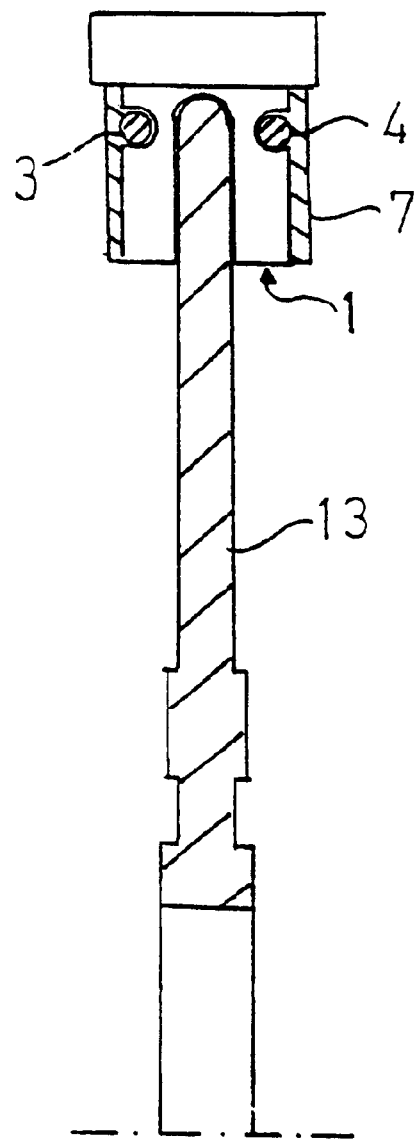
FIG. 5 shows a cross section of a pulley and an interacting saw element.
Figure 7:
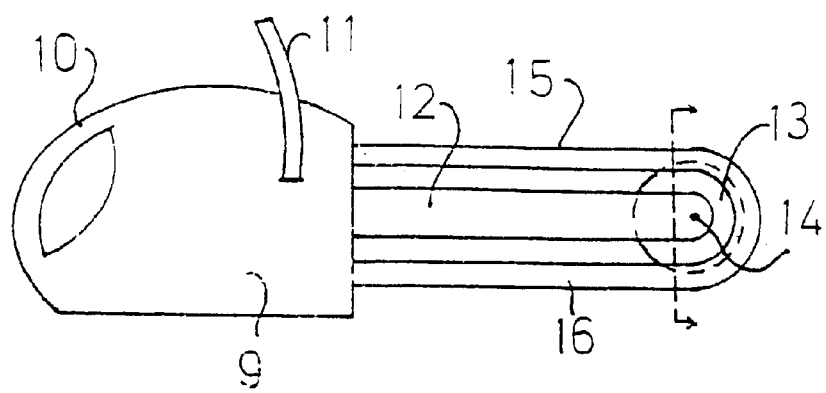
FIG. 7 shows a hand-held motor driven saw having a saw wire according to the invention.
Figure 8:
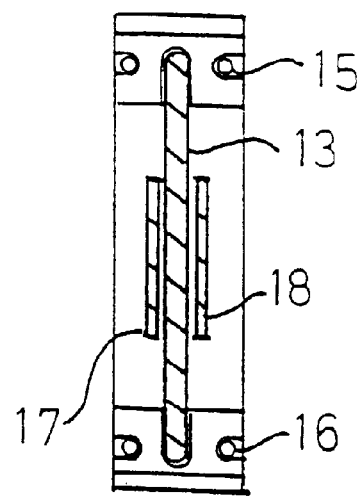
FIG. 8 shows saw blade, pulley and saw wire in cross section.

The inclusion of a saw wire in a hand-held motor saw is shown in the FIGS. 5, 7 and 8. The motor saw is of a generally state of the art design having a motor housing 9, two handles 10, 11 and a saw blade 12. The saw blade has at least in its front section two shanks 17, 18 between which there is a shaft 14 which Carries the front pulley 13. This may in known manner be adjustable to be accommodated to the length of individual saw wires an conditions of use. Inside the motor housing and not shown in the figure there is a corresponding driving wheel which at the part which is in contact with the saw wire has the same cross section profile as the pulley 13. However, the driving wheel may be of a different diameter. Both the driving wheel and the pulley 13 have smooth circumferences without cogs, teeth or the like means for the driving of the wire in other embodiments of the invention the driving wheel may be so designed that it bears on the whole of the underside of the wire.

In order to further increase the friction between the driving wheel and the wire the wire may in some embodiments be forced against the driving wheel by means of a pulley or otherwise. The wire is driven thereby that the friction in the contact with the driving wheel is so great that there is hardly any slipping. The wire is tensioned and self-supporting between the wheel and the pulley without contact with the saw blade or any other supporting surface so there is no need for lubrication.

What is claimed is:

1. A saw wire for a motor saw having an extending saw blade and including a pulley and a driving wheel around which the saw wire is arranged and carries several cutting elements which are wider than the saw blade and evenly distributed along the saw wire, the saw wire comprising:

two parallel, endless wire strings between which are platforms carried by the wires and on upper surfaces of said wires carry cutting plates, each of the platforms includes a pair of grooves formed in opposing lateral sides thereof within which respective wire strings extend so that the wire strings are positioned at a distance from each other, one outside each side surface plane of the pulley and the driving wheel, the platforms having bottom surfaces containing grooves intended to receive outer circumferences of the pulley and the driving wheel, the grooves having smooth peripheries.

2. A saw for stone or concrete using the saw wire of claim 1, wherein the pulley and the driving wheel have smooth, circular circumferences which contact the saw wire by intrusion into the groove within each cutting element of the saw wire.

3. A saw blade comprising:

a pair of parallel spaced endless wire strings;

a plurality of cutting elements positioned generally equally spaced from one another along the pair of wire strings;

each cutting element including a platform having a pair of laterally outwardly facing grooves formed within respective opposing lateral sides thereof, the pair of wire strings extending through respective laterally outwardly facing grooves, and a cutting plate connected to a side of the platform generally parallel to the wire strings; and a filler disposed between adjacent platforms configured to substantially maintain the relative positions of the adjacent platforms along the pair of wire strings.

4. The saw blade according to claim 3, wherein each cutting plate is a generally flat plate having a width slightly larger than a width of the respective platform.

5. The saw blade according to claim 3, wherein the filler is a resilient polymer material.

6. The saw blade according to claim 3, wherein each platform includes a generally vertically extending groove extending therethrough generally between and parallel to the laterally outwardly facing grooves and extending within the platform to an extent therethrough substantially past the pair of laterally outwardly facing grooves.

7. The saw blade according to claim 6, wherein the side of the platform on which the cutting plate is connected is opposite a side within which the generally extending groove is formed.

8. A saw comprising:

a pair of spaced pulleys having a substantially smooth peripheral surface;

a saw blade extending between the pair of pulleys, the saw blade including a pair of parallel spaced endless wire strings;

a plurality of cutting elements positioned generally equally spaced from one another along the pair of wire strings;

each cutting element including a platform having a pair of laterally outwardly facing grooves formed within respective opposing lateral sides thereof, the pair of wire strings extending through respective laterally outwardly facing grooves, and a cutting plate connected to a side of the platform generally parallel to the wire strings;

a filler disposed between adjacent platforms configured to substantially maintain the relative positions of the adjacent platforms along the pair of wire strings.

9. The saw according to claim 8, wherein each cutting plate is a generally flat plate having a width slightly larger than a width of the respective platform.

10. The saw according to claim 8, wherein the filler is a resilient polymer material.

11. The saw according to claim 8, wherein each platform includes a generally vertically extending groove extending therethrough generally between and parallel to the laterally outwardly facing grooves and extending within the platform to an extent therethrough substantially past the pair of laterally outwardly facing grooves, and wherein an outer peripheral portion of each pulley is engageable within the vertically extending groove of each platform, such that the pair of wire strings are disposed substantially within a peripheral extent of each pulley.

12. The saw according to claim 11, wherein the side of the platform on which the cutting plate is connected is opposite a side within which the generally extending groove is formed.

* * * * *